UNITED STATES PATENT OFFICE.

FREDERIC MILLER ENDLICH AND NICHOLAS HUNTER MUHLENBERG, OF LAKE VALLEY, TERRITORY OF NEW MEXICO.

PROCESS OF EXTRACTING METALS FROM ORES.

SPECIFICATION forming part of Letters Patent No. 350,669, dated October 12, 1886.

Application filed January 8, 1886. Serial No. 188,015. (No specimens.)

*To all whom it may concern:*

Be it known that we, FREDERIC MILLER ENDLICH and NICHOLAS HUNTER MUHLENBERG, of Lake Valley, county of Sierra, and Territory of New Mexico, have invented certain new and useful Improvements in Processes of Extracting Metals from Ores and Metallurgical Products; and we do hereby declare the following to be a full, clear, and exact description thereof, and sufficient to enable others skilled in the art to which our invention belongs to practice the same.

In the ordinary process of leaching ores and metallurgical products, which consists in the use of a calcium or sodium hyposulphite solution, it is generally necessary to roast the ores before lixiviating, or give them a chloridizing roast, in order to convert the various metallic compounds they contain into such forms that the metals can be subsequently extracted by the lixiviating solutions employed. The roasting process involves an expensive plant and a considerable current outlay in carrying on the process. We have found that the original outlay for plant can be avoided, and the subsequent expenditure for labor and material greatly lessened, by substituting for the roasting process one involving a relatively small original outlay and a corresponding decrease in running expenses. We have discovered that the desired effects of the roasting process, or, to speak more precisely, of a chloridizing roast, can be obtained cheaply and rapidly in the wet way. We have discovered that when ores containing compounds of copper, lead, silver, mercury, and other metals, (such as the sulphides, oxides, and carbonates of copper, and other compounds of that metal, the sulphides of mercury, the sulphides of silver and other compounds of silver, sulphide of lead and other metallic compounds,) are acted upon by chlorine water, the metals they contain are converted into chlorides, which can then be treated as the nature of the case may require. We have also discovered that the addition of soluble chlorides to the chlorine water intensifies the converting action of the latter.

Our invention, therefore, consists in adding to ores and metallurgical products containing compounds of the nature indicated above, chlorine water, together with soluble chlorides, preferably the chlorides of copper, iron, or sodium, as the case may be, in sufficient quantity, and continuously or repeatedly until all the metals to be extracted from the ore or product have been converted into chlorides.

Our method of procedure is as follows: We prepare chlorine water by passing chlorine gas through cold water to the point of saturation or less, or we let the water upon the ore or metallurgical product first and then pass chlorine gas through the same to the point of saturation or less. In the first case we add a suitable amount—from one tenth of one per cent. to several per cent., rarely exceeding four or five per cent.—of soluble chlorides to the water which is to be or has been charged with chlorine gas. In the latter case we place the suitable quantity of soluble chlorides upon the ore, which is contained in a vat or other receptacle, and dissolve it with as little water as possible or with chlorine water; or we simply let a solution of the chlorides containing the proper quantities upon the ore. In case the ore or product is such that when acted on by chlorine water it will yield the desired soluble chlorides, or a portion thereof, it is unnecessary to add such chlorides or the portion so furnished to the chlorine water or the ore at the outset. The more or less finely comminuted ore is placed in tubs, vats, tanks, or other suitable receptacles, and the cold chlorine water containing soluble chlorides, as above indicated, is showered down upon the ore and remains in contact therewith until its action is accomplished. By means of a siphon-pump or equivalent contrivance attached to the discharge-pipe at the lower end or under side of the receptacle containing the ore, the chlorine water is passed or drawn rapidly downward through the ore. The chlorine water which has thus once passed through the ore is collected in a suitable pit, and from there is pumped back into the receptacle (vat or tub) in which water is being charged with chlorine. As the process of charging water with chlorine gas goes on uninterruptedly in this receptacle, the chlorine water thus returned receives a fresh charge of gas, and in this way a continuous circulation of chlorine water holding metallic chlorides in solution is maintained. The course of the circulation is as follows: The chlorine water leaves the charging-vat, passes through the ore, is collected in a suitable receptacle in a pit, is pumped back into the charging-vat, is recharged while there, goes to the ore again, and the cycle of operations is repeated. This circulation is kept up for a number of hours, depending on the quantity and character of the ore under treatment.

We designate the chlorine water containing soluble chlorides as the "chloridizing-solution." It can be used repeatedly until saturated with metallic compounds. It is prevented from becoming exhausted of chlorine by being recharged from time to time with that gas, and is also regenerated and freshened, when necessary, by the addition of a quantity of the soluble chloride salt demanded by circumstances. Excess of acids which may occur occasionally will generally be corrected during continued treatment by the material operated on. We have found that heat accelerates and intensifies the reactions desired, and we produce the same by means of steam-coils or the introduction of live steam in the ore-receptacles. In order to avoid the corroding action of chlorine upon textile fabrics, which latter usually compose the filter at the bottom of the ore-receptacles, we generally substitute a filter composed mainly of "mineral wool," or asbestus, or of "slag-wool." After the ore (or metallurgical product) has been sufficiently acted upon the chlorine water holds in solution copper, lead, gold, and mercury, in case those metals are present in the ore, as previously indicated, while silver remains undissolved in the ore in the form of a chloride.

From the solution transferred to suitable receptacles the various metals may be obtained by methods known to chemists and metallurgists. Thus copper may be precipitated on scrap-iron as cement-copper, lead may be thrown down as sulphate, gold may be precipitated by ferrous sulphate, and mercury by scrap-iron, &c. In case silver is contained in the ore, it can be extracted readily and cheaply by one of the known methods of lixiviation, (notably by the sodium or calcium hyposulphite method,) since the treatment which the ore has undergone, as above described, has converted all or nearly all the silver compounds contained therein into chloride, which is dissolved by the hyposulphite or other lixiviating solution employed.

Among the soluble chlorides which we have used for aiding the action of the chlorine water, we have found the chlorides of copper, iron, and sodium especially adapted to our purpose, although many other soluble chlorides increase the percentage of extraction. We use copper or sodium chloride, or both together, when treating ores containing silver and lead more especially, while iron chlorides are especially suitable for ores containing copper and mercury. We have also found that in the case of highly basic ores, particularly basic ores containing silver, an addition of acid, rarely exceeding one per cent., to the chlorine water produces beneficial results. We have used sulphuric acid with the best success for every class of ore. In case the ores contain silver, and are such that washing with water is necessary before the lixiviation with chemical solutions takes place, such washing should be done before the chlorine water is let upon the ore. In most instances, however, the application of the chlorine water, as above described, renders all washing unnecessary, even though it would ordinarily be required. When copper and lead are both present in the ore, the lead may be precipitated from the mixed solution of copper and lead chlorides by sulphuric acid, leaving the copper in solution as sulphate, in which form it is used in certain methods of lixiviation. In case copper or quicksilver ores are under treatment, and with some gold, lead, and antimonial ores, the above-described method acts as a complete leaching method. With most silver ores it acts as a preparatory treatment for subsequent lixiviation by ordinary known methods. In the latter case, and in some of the former, the treatment described entirely obviates the necessity of a chloridizing roast.

As the conversion of silver compounds into chlorides is somewhat retarded if the particles of the mineral are of large size, it is desirable that ores which are treated for silver should be crushed down to a size not larger than would pass a thirty-mesh screen, laboratory size, while for copper ores a size of ten to sixteen mesh will usually be small enough.

We are aware that it is a well-known practice to "chlorinate" ores of the precious metals by injecting chlorine gas into the moistened ore pulp, previously roasted, for the purpose of converting gold and silver into chlorides, which are then extracted by different methods. We are also aware that heretofore it has been proposed to desulphurize and chloridize gold and silver by injecting chlorine gas into the ore pulp and then dry steam or hot air, without roasting the ore, previous to amalgamating the precious metals contained in the ore; but our invention differs from the process described in that we act on the ores of base metals, as well as of precious metals, by chlorine water containing soluble chlorides applied in sufficient quantity and repeatedly or continuously until all the metals to be extracted are converted into chlorides, while such metals as furnish soluble chlorides are by this procedure actually extracted from the ore, and can then be separated and recovered from the solution. We thus use chlorine water containing soluble chlorides as a solution for extracting metals from their ores as well as a converting agent.

We are also aware that a method of dissolving silver from roasted and chloridized ores by means of hot brine acidulated with hydrochloric acid, or into which chlorine gas has been introduced, has been described; but our invention differs from such method in acting on unroasted ores with chlorine water containing metallic chlorides—such as copper and iron chlorides—which act as converting agents, besides the sodium chloride. The chlorides we employ add their power of converting sulphides into chlorides to the chloridizing power of the chlorine water, thus increasing the efficiency of the latter.

Our invention cheapens the extraction of the metals named above, thus enabling us to treat ores thereof of a lower grade than can be profitably treated by present methods.

In extracting quicksilver our invention dispenses with any degree of heat which would cause the volatilization of the metal, which has hitherto been notoriously injurious to health and life, and in treating ores of the precious metals our method supplies a preliminary or preparatory treatment which increases the yield of metal at but a nominal expense, and is a substitute for the expensive chloridizing roast.

Having thus described our invention, what we claim as new, and desire to secure by Letters Patent, is—

1. The process of converting the metallic bases contained in ores and metallurgical products into chloridized compounds, which consists in adding to the ores or metallurgical products chlorine water containing common salt and soluble metallic chlorides—such as the chlorides of copper and iron—in sufficient quantity and repeatedly or continuously until the metals to be extracted have been converted into chlorides, substantially as specified.

2. The process of converting the metallic bases contained in ores and metallurgical products into chloridized compounds, which consists in adding to the ores or metallurgical products chlorine water containing soluble metallic chlorides—such as the chlorides of copper and iron—in sufficient quantity or continuously or repeatedly until the metals to be extracted have been converted into chlorides, substantially as specified.

In testimony that we claim the foregoing we have hereunto set our hands this 30th day of December, A. D. 1885.

FREDERIC MILLER ENDLICH.
NICHOLAS HUNTER MUHLENBERG.

Witnesses:
E. G. WICKS,
DONALD FERGUSON.